United States Patent
Verma et al.

(10) Patent No.: US 12,413,971 B2
(45) Date of Patent: Sep. 9, 2025

(54) SYSTEM AND METHOD FOR ELECTRONIC RESOURCE TRANSFERS IN A DISTRIBUTED NETWORK VIA NETWORK-PAIRED RESOURCE TRANSFER DEVICES

(71) Applicant: BANK OF AMERICA CORPORATION, Charlotte, NC (US)

(72) Inventors: Sandeep Verma, Haryana (IN); Nandini Rathaur, Maharashtra (IN); Pavan Chayanam, Alamo, CA (US); Srinivas Dundigalla, Waxhaw, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 222 days.

(21) Appl. No.: 18/136,681

(22) Filed: Apr. 19, 2023

(65) Prior Publication Data
US 2024/0357347 A1 Oct. 24, 2024

(51) Int. Cl.
*H04W 12/06* (2021.01)
*H04W 12/50* (2021.01)

(52) U.S. Cl.
CPC ........... *H04W 12/06* (2013.01); *H04W 12/50* (2021.01)

(58) Field of Classification Search
CPC .............................. H04W 12/06; H04W 12/50
See application file for complete search history.

(56) References Cited

U.S. PATENT DOCUMENTS

| | | | |
|---|---|---|---|
| 7,801,825 B2 | 9/2010 | Kranzley et al. | |
| 7,949,609 B2 | 5/2011 | Colella | |
| 9,202,028 B2 * | 12/2015 | White | H04L 63/0861 |
| 9,311,546 B2 * | 4/2016 | Puerto | G10L 17/18 |
| 9,648,015 B1 | 5/2017 | Avetisov et al. | |
| 9,990,628 B2 * | 6/2018 | Giobbi | G06Q 20/40145 |
| 10,055,733 B2 * | 8/2018 | Hanna | H04W 12/06 |
| 10,257,191 B2 * | 4/2019 | Allen | G06N 3/08 |
| 10,291,610 B2 | 5/2019 | Chang et al. | |
| 10,355,730 B1 * | 7/2019 | Zalewski | G06Q 30/0635 |
| 10,762,483 B2 * | 9/2020 | Bondesen | G06Q 20/385 |
| 10,812,130 B2 | 10/2020 | Talla et al. | |
| 11,030,608 B2 | 6/2021 | Aabye et al. | |
| 11,038,262 B2 | 6/2021 | Yehezkely | |
| 11,429,973 B2 | 8/2022 | Kohli | |
| 2011/0145899 A1 * | 6/2011 | Cao | H04L 9/3226 726/7 |

(Continued)

*Primary Examiner* — Oleg Korsak
(74) *Attorney, Agent, or Firm* — Moore & Van Allen PLLC; Andrew T. Wood

(57) ABSTRACT

Systems, computer program products, and methods are described herein for electronic resource transfers in a distributed network via network-paired resource transfer devices. The present invention is configured to receive login credentials from a user via a user interface of an endpoint device to access an account, determine, in response to a prompt by the user, at least one network device on a wireless network, wherein the at least one network device may include a resource transfer device, display the resource transfer device on the user interface, receive a selection of the resource transfer device via the user interface, activate a user characteristic authentication feature of the resource transfer device, and receive a signal of an authenticated user characteristic from the resource transfer device.

15 Claims, 6 Drawing Sheets

(56) References Cited

U.S. PATENT DOCUMENTS

| | | | |
|---|---|---|---|
| 2017/0083909 A1* | 3/2017 | Mork | G06Q 20/385 |
| 2020/0005261 A1 | 1/2020 | Arora et al. | |
| 2021/0035109 A1 | 2/2021 | Wong et al. | |
| 2021/0090066 A1* | 3/2021 | Beye | G06Q 20/02 |
| 2021/0338372 A1* | 11/2021 | Black | A61B 90/53 |
| 2021/0344672 A1* | 11/2021 | Drechsler | G06Q 20/02 |
| 2022/0014527 A1* | 1/2022 | Ratnakaram | H04L 63/12 |
| 2022/0058906 A1* | 2/2022 | Dundigalla | G06Q 20/407 |
| 2022/0138746 A1* | 5/2022 | Rodriguez | G07F 19/211 |
| | | | 705/43 |

* cited by examiner

```
                                                    300
                                                   ↙

┌─────────────────────────────────────────────────────────────┐
│ RECEIVE A REQUEST FOR AN ELECTRONIC RESOURCE TRANSFER FROM A │
│         MERCHANT OVER THE WIRELESS NETWORK                   │
│                          302                                 │
└─────────────────────────────────────────────────────────────┘
                              ↓
┌─────────────────────────────────────────────────────────────┐
│ RECEIVE A SELECTION FROM A USER ON A USER INTERFACE OF AN    │
│ ENDPOINT DEVICE FOR A PAIRED RESOURCE TRANSFER DEVICE,       │
│ WHEREIN IDENTIFICATION DATA FROM THE PAIRED RESOURCE         │
│ TRANSFER IS ENCRYPTED OVER THE WIRELESS NETWORK              │
│                          304                                 │
└─────────────────────────────────────────────────────────────┘
                              ↓
┌─────────────────────────────────────────────────────────────┐
│ TRANSMIT A REQUEST TO THE USER TO AUTHENTICATE THE ELECTRONIC│
│  RESOURCE TRANSFER VIA THE PAIRED RESOURCE TRANSFER DEVICE   │
│                          306                                 │
└─────────────────────────────────────────────────────────────┘
                              ↓
┌─────────────────────────────────────────────────────────────┐
│ RECEIVE A SIGNAL OF AN AUTHENTICATED USER CHARACTERISTIC FROM│
│            THE PAIRED RESOURCE TRANSFER DEVICE               │
│                          308                                 │
└─────────────────────────────────────────────────────────────┘
                              ↓
┌─────────────────────────────────────────────────────────────┐
│ AUTHENTICATE THE TRANSACTION VIA DATA PACKETS OVER THE       │
│                   WIRELESS NETWORK                           │
│                          310                                 │
└─────────────────────────────────────────────────────────────┘
                              ↓
┌─────────────────────────────────────────────────────────────┐
│          COMPLETE THE ELECTRONIC RESOURCE TRANSFER           │
│                          312                                 │
└─────────────────────────────────────────────────────────────┘
```

FIG. 3

SYSTEM AND METHOD FOR ELECTRONIC RESOURCE TRANSFERS IN A DISTRIBUTED NETWORK VIA NETWORK-PAIRED RESOURCE TRANSFER DEVICES

FIELD OF THE INVENTION

The present invention embraces a system for electronic resource transfers in a distributed network via network-paired resource transfer devices.

BACKGROUND

Currently, most software systems provide two types of firewall configurations, private network configurations, and public network configurations. When endpoint devices are connected to a public network, the devices implement more strict security checks and restrictions for communication between endpoint devices. When endpoint devices are connected to a private network, the devices implement less strict security checks and restrictions for communications between endpoint devices, according to the private network configuration. However, such communications in private networks allow for the seamless and frustration-free integration of various devices. Thus, when devices transmitting sensitive information related to electronic resource transfers connect to private networks, these devices can benefit from additional layers of protection against malfeasance. Accordingly, there is a need for a system and method for electronic resource transfers in a distributed network via network-paired resource transfer devices.

BRIEF SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for electronic resource transfers in a distributed network via network-paired resource transfer devices is presented. The system may include a processing device, a non-transitory storage device containing instructions when executed by the processing device causes the processing device to perform the steps of: receiving login credentials from a user via a user interface of an endpoint device to access an account, determining, in response to a prompt by the user, at least one network device on a wireless network, wherein the at least one network device may include a resource transfer device, displaying the resource transfer device on the user interface, receiving a selection of the resource transfer device via the user interface, activating a user characteristic authentication feature of the resource transfer device, and receiving a signal of an authenticated user characteristic from the resource transfer device.

In some embodiments, executing the instructions further causes the processing device to perform the steps of: receiving confirmation from the user to pair the resource transfer device with the wireless network, transmitting a one-time authentication token and a request for authorization to the endpoint device, receiving the one-time authentication token from the user, and storing pairing data including details of the wireless network and resource transfer device data in a storage device as a paired resource transfer device.

In some embodiments, executing the instructions further causes the processing device to perform the steps of: receiving a request for an electronic resource transfer from a merchant over the wireless network, receiving a selection from a user on a user interface of an endpoint device for the paired resource transfer device, wherein identification data from the paired resource transfer device is encrypted over the wireless network, transmitting a request to the user to authenticate the electronic resource transfer via the paired resource transfer device, receiving a signal of an authenticated user characteristic from the paired resource transfer device, authenticating the electronic resource transfer via data packets over the wireless network, and completing the electronic resource transfer.

In some embodiments, the resource transfer device is operatively coupled to the wireless network via a short-range wireless data transfer protocol.

In some embodiments, the resource transfer device is operatively coupled to the wireless network via Wi-Fi.

In some embodiments, the one-time authentication token is transmitted to the endpoint device via at least one selected from the group consisting of: a short message service and an authentication application.

In some embodiments, the resource transfer device may include a backscatter device for operatively coupling the resource transfer device to the wireless network, wherein the backscatter device is configured to harvest and backscatter an ambient signal.

In another aspect, a computer program product for electronic resource transfers in a distributed network via network-paired resource transfer devices is presented. The computer program product may include a non-transitory computer-readable medium including code causing an apparatus to receive login credentials from a user via a user interface of an endpoint device to access an account, determine, in response to a prompt by the user, at least one network device on a wireless network, wherein the at least one network device may include a resource transfer device, display the resource transfer device on the user interface, receive a selection of the resource transfer device via the user interface, activate a user characteristic authentication feature of the resource transfer device, and receive a signal of an authenticated user characteristic from the resource transfer device.

In yet another aspect, a method for electronic resource transfers in a distributed network via network-paired resource transfer devices is presented. The method may include receiving login credentials from a user via a user interface of an endpoint device to access an account, determining, in response to a prompt by the user, at least one network device on a wireless network, wherein the at least one network device may include a resource transfer device, displaying the resource transfer device on the user interface, receiving a selection of the resource transfer device via the user interface, activating a user characteristic authentication feature of the resource transfer device, and receiving a signal of an authenticated user characteristic from the resource transfer device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 2:
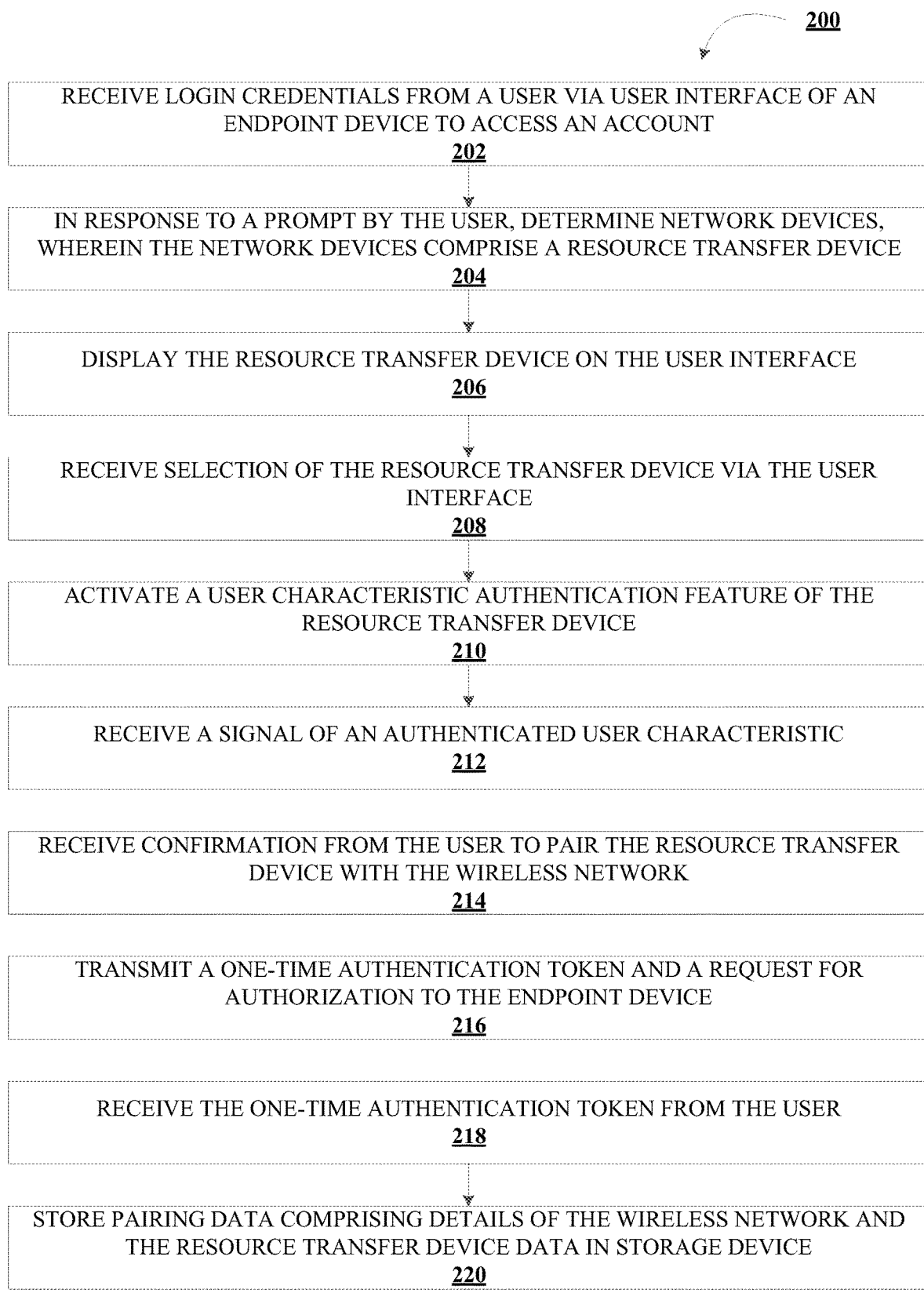

Having thus described embodiments of the invention in general terms, reference will now be made the accompanying drawings, wherein:

FIGS. 1A-1D illustrate technical components of an exemplary distributed computing environment for electronic resource transfers in a distributed network via network-paired resource transfer devices, in accordance with an embodiment of the invention;

FIG. 2 illustrates a process flow for electronic resource transfers in a distributed network via network-paired resource transfer devices, in accordance with an embodiment of the invention; and FIG. 3 illustrates a process flow for electronic resource transfers in a distributed network via network-paired resource transfer devices, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, user characteristic information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" or "user interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, a transmission of a digital audio signal, or the like. As used herein, an "interacting user" may refer to a user who is engaging in the interaction, such as a caller to a helpdesk, a customer interacting with a digital assistant, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "resource transfer device" may refer to an electronic payment vehicle, such as an electronic credit or debit card.

The technology described herein implements an approach to wirelessly utilizing payment instruments such as resource transfer devices through a private network, and in some embodiments utilizing user characteristic authentication feature of the resource transfer device to validate the identity of the user as a portion of the authorization process during the use of the resource transfer device. Moreover, the technology described herein allows for the registration and pairing of a resource transfer device within the private network through the systems of an entity to enable the transfer of resources to a third party through a selection of prompts on an endpoint device(s), where the endpoint device(s) is connected to the resource transfer device(s), thus allowing for the resource transfer to occur.

Prior to the invention described herein, users who wish to transfer resources electronically were prompted to manually enter a series of numbers representing resource transfer device numbers, expiration dates, security codes, names, and addresses into endpoint devices. Not only is this methodology inefficient and prone to error, but an unauthorized user in possession of a resource transfer device may be able to overcome existing security measures to improperly transfer resources.

The invention disclosed herein provides a system, method, and computer program product that allows for the pairing of resource transfer devices with private wireless networks, such that the resource transfer device is discoverable and in operative communication with endpoint devices on the private wireless network. In this way, a user may initiate a resource transfer electronically through an endpoint device, be authenticated through a user characteristic authentication feature 182 of the resource transfer device, and proceed with the resource transfer, without requiring the manual entry of numbers into the endpoint device.

Accordingly, the present disclosure provides for the electronic resource transfers via network-paired resource transfer devices. Login credentials are received through entry within an application on a user interface of a device, such as to access an account. The presence of a resource transfer device is determined, and thereafter displayed as such on the user interface. The user selects the resource transfer device on the app, then a user characteristic authentication feature of the resource transfer device is activated. After supplying the resource transfer device with a fingerprint, the system receives a signal indicating authentication based on the user characteristic from the resource transfer device. Confirmation to pair the resource transfer device with the wireless network is received from the user, and a one-time password is transmitted to a device. After entry of the one-time password, the system stores details of the wireless network and the resource transfer device to avoid having to repeat the pairing process later. Thereafter when a payment is requested by a merchant over a device within the wireless network, the user selects the paired resource transfer device via a user interface. A request is then transmitted to authenticate the resource transfer via the paired resource transfer device, and a signal indicating authentication based on the user characteristic from the paired resource transfer device is transmitted. Once the electronic resource transfer is authenticated, the electronic resource transfer is completed.

What is more, the present invention provides a technical solution to a technical problem. As described herein, the technical problem includes the inability to interface with resource transfer devices from within a wireless network and to use the resource transfer devices as portions of the "internet of things." The technical solution presented herein allows for the pairing of resource transfer devices to a wireless network, and as a result of the pairing, allow for the wireless use of the resource transfer devices in transferring resources electronically through endpoint devices. In particular, the system is an improvement over existing resource transfer systems by providing verification of the authenticity of an interacting user (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing and manual resources.

Figure 1A:
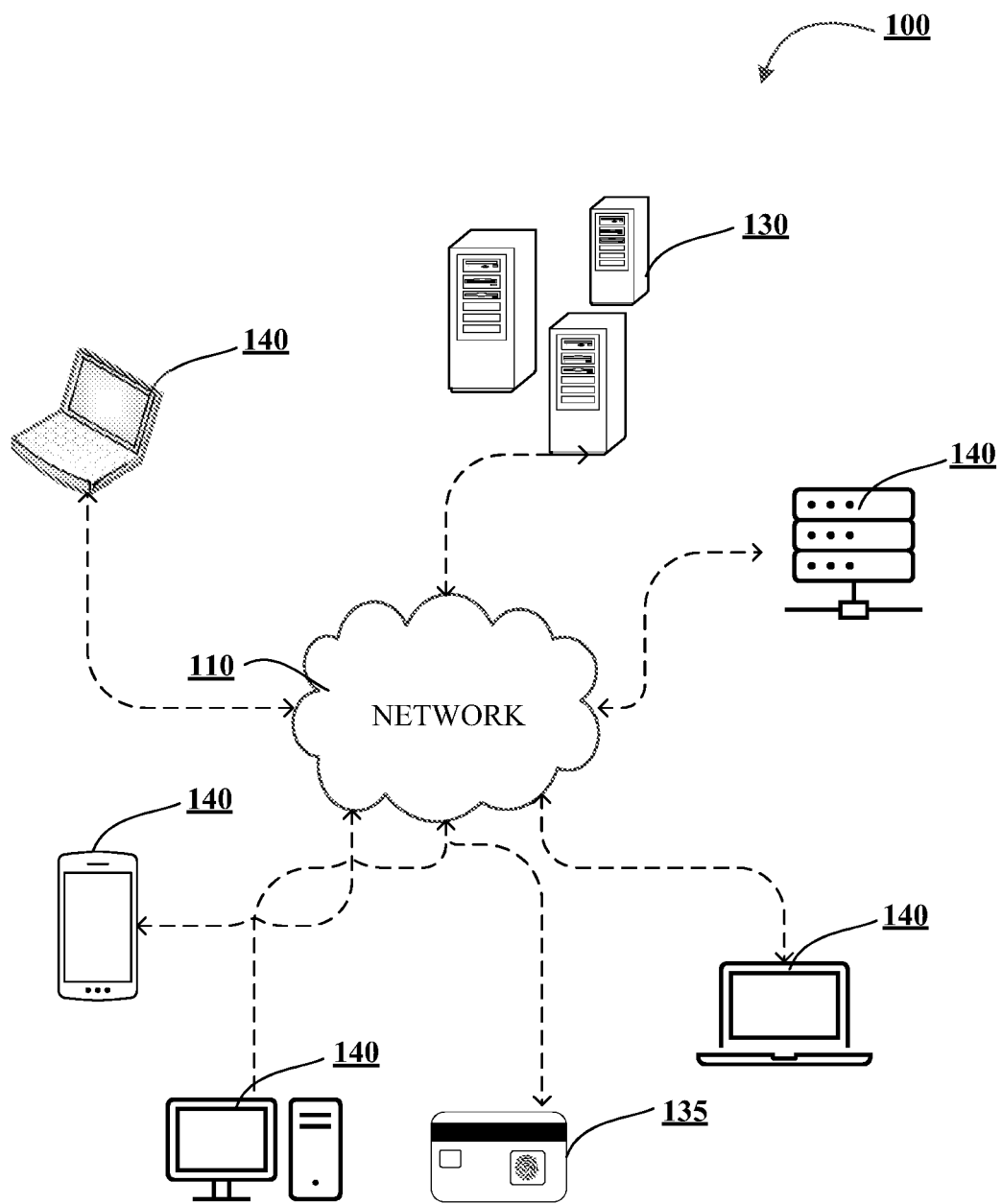

FIGS. 1A-1D illustrate technical components of an exemplary distributed computing environment 100 for electronic resource transfers in a distributed network via network-paired resource transfer devices, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

Figure 1B:
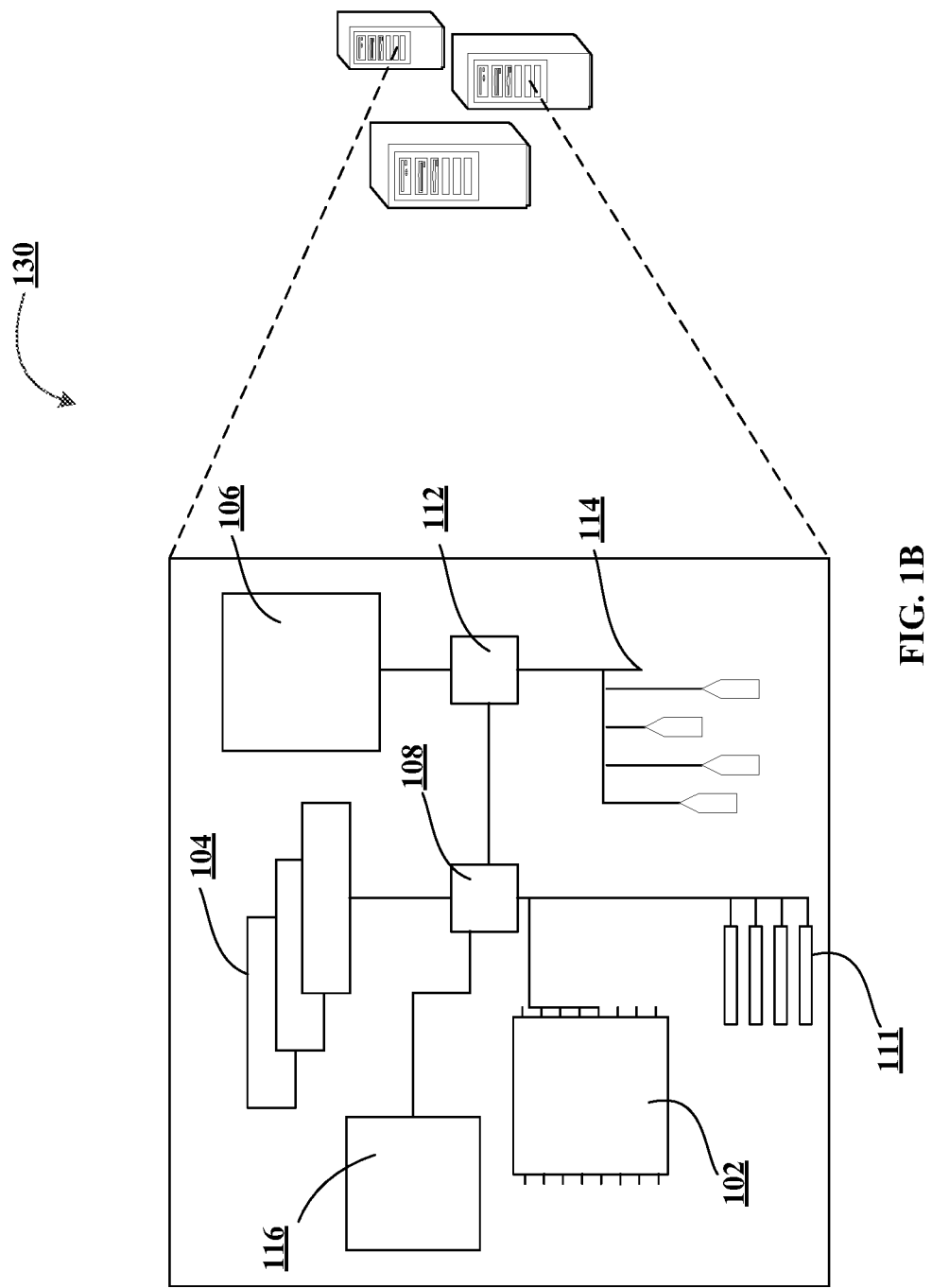

FIG. 1B illustrates an exemplary component-level structure of the system 130, in accordance with an embodiment of the disclosure. As shown in FIG. 1B, the system 130 may include a processor 102, memory 104, input/output (I/O)

device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

Figure 1C:
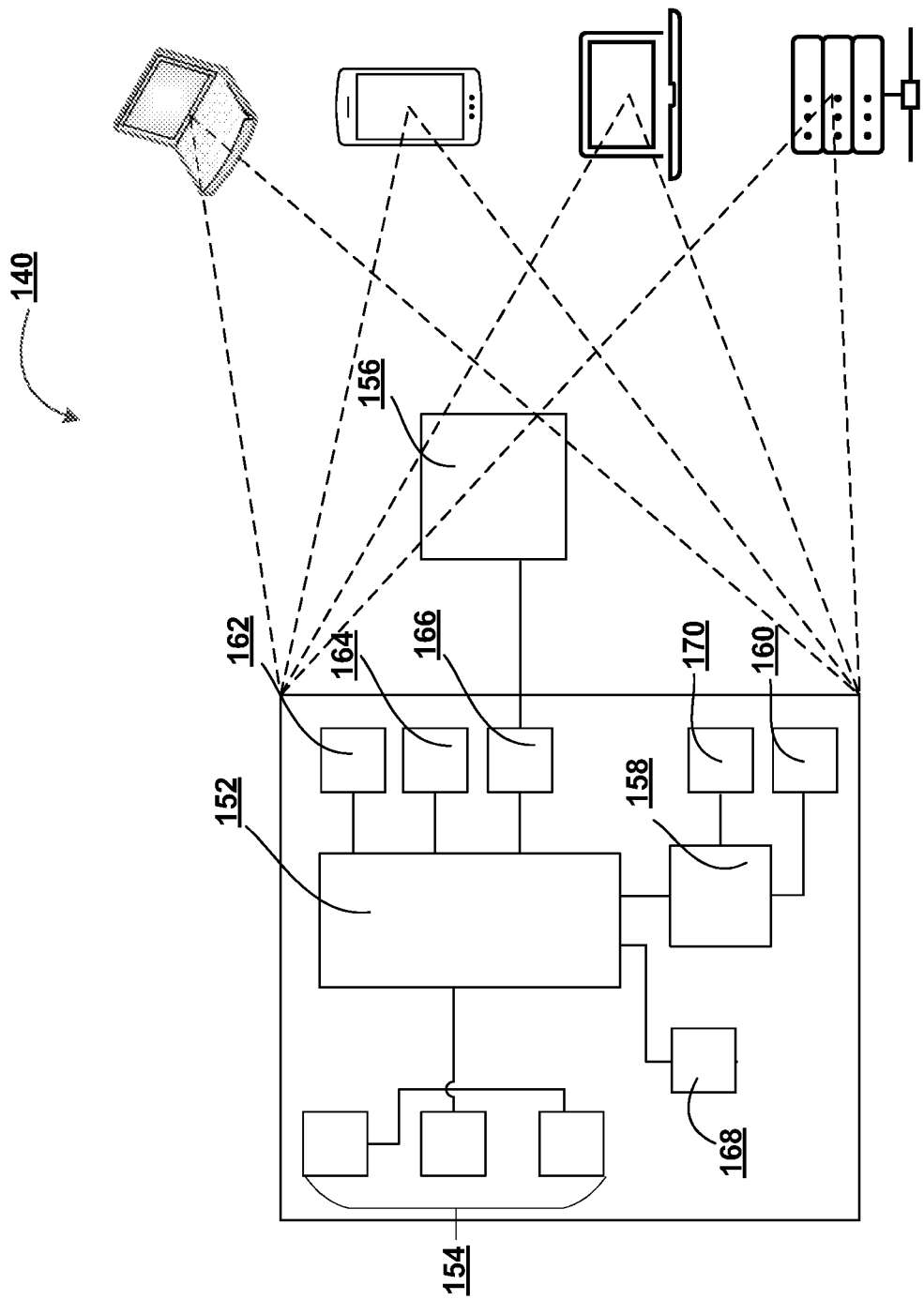

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Figure 1D:
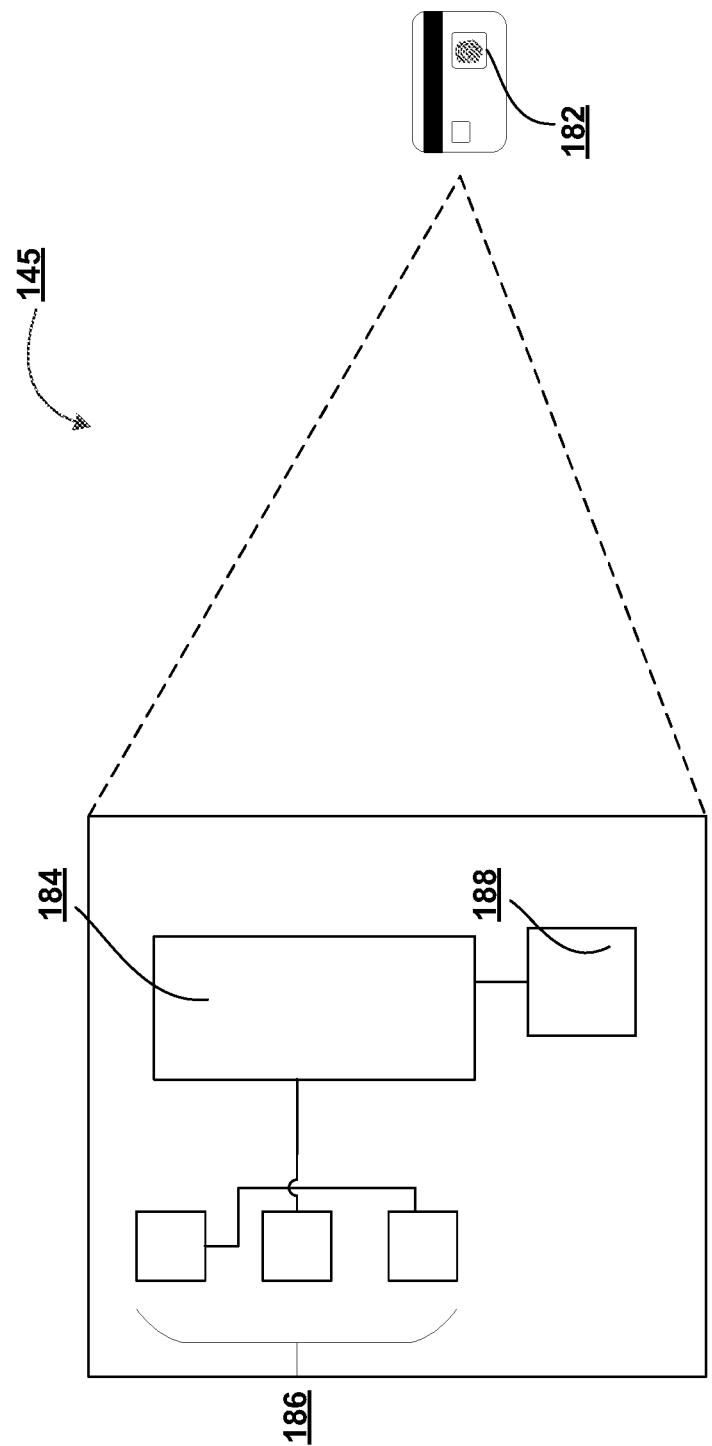

FIG. 1D illustrates an exemplary component-level structure of the electronic resource device(s) 145, in accordance with an embodiment of the invention. As shown in FIG. 1D, the electronic resource device(s) 145 includes a processor 184, memory 186, and a communication interface 188, among other components. The electronic resource device(s) 145 may also be provided with a storage device, such as a microdrive or other device, to provide additional storage. Each of the components 184, 186, and 188 are interconnected using various buses and/or circuit traces, and several of the components may be mounted on a common printed circuit board ("PCB"), motherboard, or in other manners as appropriate.

The processor 184 is configured to execute instructions within the electronic resource device(s) 145, including instructions stored in the memory 186, including certain logic, data processing, and data storing functions. The processor may be implemented as a chipset of chips that include separate and multiple analog and digital processors. The processor may be configured to provide, for example, for coordination of the other components of the electronic resource device(s) 145, such as wireless communication by electronic resource device(s) 145.

The memory 186 stores information within the electronic resource device(s) 145. The memory 186 can be implemented as one or more of a computer-readable medium or media, a volatile memory unit or units, or a non-volatile memory unit or units, or as a portion of the integrated circuit containing the processor itself. The memory 186 may include, for example, flash memory and/or NVRAM memory. In some embodiments, the memory 186 contains data of identifiers associated with the electronic resource device(s) such as a card number, expiration date, security code, name of the registrant, and so forth.

In some embodiments, the user may use the electronic resource device(s) 145 to transmit and/or receive information or commands to and from the system 130 via the network 110. Any communication between the system 130 and the electronic resource device(s) 145 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the electronic resource device(s) 145 may provide the system 130 or endpoint device(s) 140 permissioned access to the protected resources of the electronic resource device(s) 145, which may include numbers associated with the electronic resource device(s) 145, customer information, etc.

The electronic resource device(s) 145 may communicate with the system 130 through communication interface 188, which may include digital signal processing circuitry where necessary. The communication interface 188 may provide for communications under various short-range communications such as using RFID, Bluetooth, Wi-Fi, or other such communications, as described herein.

In some embodiments, the communication interface 188 may be a backscatter device, for example a backscatter device such as that which is described in U.S. Pat. No. 10,812,130. Backscatter devices harvest and utilize ambient signals (such as ambient Wi-Fi, short-range wireless data transfer protocol (e.g., Bluetooth), and/or other radio frequencies), toggle the impedance of the backscatter device, and/or eliminate higher order harmonic components of signals in order to communicate via a wireless Wi-Fi network without the need for a standalone power supply such as a battery or DC voltage. The backscatter device may include an antenna structured to backscatter a signal, a baseband circuitry to provide a frequency plan, a frequency synthesizer operatively coupled to the baseband circuitry, and/or a switch to control the backscatter device impedance. By implementing a backscatter device as the communication interface 188, the electronic resource device(s) 145 are able to connect to Wi-Fi networks of the IEEE 802.11 internet protocol.

Additionally, or alternatively, the communication interface 188 may be a tag such as an RFID or Near Field Communication (NFC) tag, wherein the tag is structured to be energized by a reader device of an endpoint device 140 through electromagnetic induction to transfer data. In such an embodiment, the tag receives a request from the reader device, and returns a response to the reader device. Thereafter, the reader device communicates a corresponding IPv6 response package to another endpoint device 140 of the network (e.g., a node).

Additionally, or alternatively, the communication interface 188 may be a passive Bluetooth (e.g., short-range wireless data transfer protocol) backscatter tag such as that which is described in U.S. Pat. No. 11,038,262, structured to harvest/backscatter multi-band energy with one or more harvesting loop antennas to operate on specific frequency bands within Bluetooth low energy (BLE) bands. In this way, the electronic resource device(s) are able to communicate and connect to networks via Bluetooth without requiring a stand-alone power source such as a battery or DC voltage.

The electronic resource device(s) 145 may also contain a user characteristic authentication feature 182 operatively coupled to the processor 184, memory 186, and communication interface 188. The user characteristic authentication feature 182 may be a capacitive fingerprint reader such as that which is described in U.S. Patent Application Publication No. 2021/0035109, and is structured to receive fingerprint image data, extract digital information and generate a current fingerprint template data, and determine if the current fingerprint template data matches the enrollment fingerprint template data. Accordingly, the entity that issued the electronic resource device(s) 145 confirms through the system 130 that the person utilizing the electronic resource device(s) 145 is the same as that which is permitted to do so.

Various implementations of the distributed computing environment 100, including the system 130, endpoint device(s) 140, electronic resource device(s) 145, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for electronic resource transfers in a distributed network via network-paired resource transfer devices, in accordance with an embodiment of the invention. The process may begin at block 202 wherein the system 130 receives from a user the user's login credentials. The login credentials are supplied by the user to a user interface (e.g., a graphical user interface) of an endpoint device 140, within an application provided by the entity and installed and operated on the user device. For example, the user may enter login credentials such as an alphanumeric username and password, which are evaluated for matching against a stored password for the same username. Additional layers of authentication through the endpoint device 140 may be required, such as a user characteristic (e.g., facial recognition, fingerprint scanning, etc.) through the entity application on the endpoint device 140. Therefore, if the username and password match, the user is able to access an account associated with the user, such as to view resource balances, send/receive resources, and otherwise interact with the entity regarding the user's account(s).

The process continues at block 204, where the system 130 determines at least one network device on a wireless network. This determination occurs in response to a prompt by the user on a user interface of a user device, for example by pressing a button that says "Find Nearby Wi-Fi" or similar. As illustrated in FIG. 1D, the resource transfer device(s) 145 is configured to join local (e.g., private) wireless networks, either by connecting directly through IEEE 802.11 protocols, or by connecting to an endpoint device 140 through Bluetooth (a short-range wireless data transfer protocol), RFID, or NFC communication protocols. Accordingly, and in some embodiments, endpoint device 140 may contains a reader device to elicit and/or receive a communicative response from the Bluetooth, RFID, NFC. In this way, the resource transfer device 145 is operatively and communicatively coupled to the wireless network. Alternatively, and as described also with respect to FIG. 1D, in some embodiments the resource transfer device 145 may utilize a backscatter device for operatively coupling the resource transfer device 145 to the wireless network such that the backscatter device harvests and backscatters an ambient signal to connect to IEEE 802.11 protocols or Bluetooth protocols. Accordingly, the resource transfer device 145 may functionally operate as a network device such that it is operatively coupled to the endpoint device 140 which contains the entity application in communication with the entity systems.

The process may continue at block 206, wherein the system 130 initiates the display of the resource transfer device 145 on the user interface of the endpoint device 140, such as to indicate to the user that the resource transfer device 145 is available for connection thereto. In some embodiments, a plurality of resource transfer devices 145 may be shown on the user interface. Moreover, the user interface may also display endpoint devices 140 within the wireless network. Accordingly, and as shown in block 208, the user makes a selection of the resource transfer device 145 via the user interface and the system 130 receives such selection and proceeds with connecting to the resource transfer device 145 in the local wireless network.

The process may then continue at block 210, where the system 130 activates a user characteristic authentication feature 182 of the resource transfer device 145. As described with respect to FIG. 1D, the resource transfer device 145 may contain a user characteristic authentication feature 182, such as a fingerprint reader. The user places a finger on a touchpad of the user characteristic authentication feature 182 once the resource transfer device 145 is connected to the wireless network. The resource transfer device 145 contains a stored fingerprint template, and a user characteristic matching process is initiated to compare the fingerprint template data extracted from the user's finger image from the touchpad to the stored template. If a match occurs, the user is authenticated, and the resource transfer device 145 and/or the endpoint device 140 with which the resource transfer device 145 is in operative communication transmits a signal to the system 130 that user characteristic is authenticated, such as is indicated in block 212. If the user characteristic authentication fails, the reader and/or endpoint device 140 and/or resource transfer device 145 may prompt the user to try again.

Continuing with block 214 assuming that the user characteristic has been authenticated, the system 130 may prompt the endpoint device 140 to display a request for confirmation to the user via the user interface. For example, the user interface may display "Would you like to pair this device?" Accordingly, the user indicates a desire to do so, affirms through an action such as pressing or clicking, or other suitable gesture, and the system 130 receives confirmation to pair the resource transfer device 145 with the wireless network.

Block 216 illustrates that the system 130 transmits a one-time authentication token and a request for authorization to the endpoint device 140. The one-time authentication token is only valid for a single use and expires after a short period, providing an additional layer of security to the authentication process. The one-time authentication token is transmitted to the endpoint device 140 through either a short message service or an authentication application. The specific method chosen will depend on the capabilities and preferences of the endpoint device 140 as decided by a user or the entity. Once received by the endpoint device 140, the one-time authentication token can be used to verify the identity of the user or device making the request and to grant access to the requested resource or service.

Continuing with block 218, the system 130 receives the one-time authentication token from the user. For example, if the user has been provided a one-time authentication token via short message service ("SMS"), the user will then retrieve the token from the SMS message and enter the token in the entity application of the endpoint device 140. Alternatively, the user may be provided a hyperlink in the message to click and subsequently be forwarded to the application for automatic entry of the token.

The process may continue at block 220, where the system 130, using a storage device of the system 130, stores pairing data of the resource transfer device 145. By storing both the resource transfer device details, such as one or more numbers (e.g., identification data) associated with the resource transfer device 145 (such as a resource transfer device identifier number, expiration date, security code, and/or an account number) while also storing details regarding the network on which the resource transfer device 145 is connected (such as, for example, a service set identifier ("SSID"), or a network name). Together, from the perspective of the entity, these two sets of attributes form a "paired" resource transfer device 145, such that the entity is able to identify the network with which the resource transfer device 145 is expected to be connected.

FIG. 3 illustrates a process flow 300 for electronic resource transfers in a distributed network via network-paired resource transfer devices, in accordance with an embodiment of the invention. At block 302, the system 130 receives a request for an electronic resource transfer over the wireless network. Such request may be initialized by the user, for example at a website of a merchant where the merchant outlines the methods of payment (e.g., methods of resource transfers) and the user selects to use the resource transfer device 145 via the private network. As a result of the selection by the user, the user may be presented with one or more resource transfer device(s) 145 since any given private network may contain one or more resource transfer device(s) 145. Accordingly, the user may then subsequently select the desired resource transfer device 145 on the user interface of the endpoint device 140, the selection of which is transmitted to the system 130 as a request for an electronic resource transfer.

Accordingly, the process may then continue at block 304, where the system 130 receives a selection from a user on a user interface of an endpoint device 140 for the paired resource transfer device 145. In other words, the resource transfer device 145 is selected, with the resource transfer device 145 being graphically shown as available in the private network and paired with the private network in accordance with the process outlined in FIG. 2. In some embodiments, the identification data (such as a resource transfer device 145 identifier number, expiration date, security code, and/or an account number) from the paired resource transfer device 145 is encrypted prior to any transfer of the identification data between the resource transfer device 145 and any endpoint device 140 over the wireless network. In some embodiments, only basic information of the resource transfer device 145 is provided over the private network, unencrypted, such as the name of the owner and/or the name of the issuer of the resource transfer device 145. In such embodiments, the system 130 may only provide this basic information until the user selects a particular paired resource transfer device 145, in which case thereafter the paired resource transfer device 145 may then transfer the identification data to proceed with the following steps.

The process may continue at block 306 where the system 130 transmits a request to the user to authenticate the electronic resource transfer via the paired resource transfer device 145. It shall be appreciated that once the user selects the paired resource transfer device 145, the entity may desire to ensure that the user of the paired resource transfer device 145 is a user who is authorized to utilize the electronic resource device 145. Accordingly, the system 130 will indicate to the user, and instruct the user via the user interface of an endpoint device 140, to authenticate with a user characteristic authentication feature 182 of the resource transfer device 145. Thereafter, in one embodiment, the user will place a finger on the user characteristic authentication feature 182.

In accordance with the processes as described with respect to FIG. 1D, the process may then continue at block 308, where the system 130 receives a signal of an authenticated user characteristic from the paired resource transfer device 145. As noted, the resource transfer device 145 contains a stored fingerprint template, and a user characteristic matching process is initiated to compare the fingerprint template data extracted from the user's finger image from the touchpad to the stored template. If a match occurs, the user is authenticated, and the resource transfer device 145 and/or the endpoint device 140 with which the resource transfer device 145 is in operative communication transmits a signal to the system 130 that user characteristic is authenticated, such as is indicated in block 308. If the user characteristic authentication fails, the reader and/or endpoint device 140 and/or resource transfer device 145 may prompt the user to try again.

Continuing at block 310, once the user characteristic has been authenticated, the system 130 may then authenticate the electronic resource transfer and initiate the transmission of data packets over the wireless network from the electronic resource device to the endpoint device 140. The data packets may contain further identification information and/or data pertaining to the authorization of the electronic resource transfer. The endpoint device 140 may then receive and combine the data packets, and in some embodiments automatically enter the identification data into electronic resource transfer completion fields of a merchant (for example, fields on a website requesting the entering of identification data).

Thereafter, as shown in block 312, the system 130 may then complete the electronic resource transfer. For example, the system 130 may remove an agreed-upon amount of electronic resources from an account associated with the resource transfer device 145, and subsequently provide an account associated with a merchant, or a clearing house, for the same amount, or a portion of the same amount. In some embodiments, the system may implement various other routine methods for transferring electronic resources from the account associated with a user to an entity as will be understood by one of ordinary skill in the art.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for electronic resource transfers in a distributed network via network-paired resource transfer devices, the system comprising:
    a processing device;
    a non-transitory storage device containing instructions when executed by the processing device causes the processing device to perform the steps of:
    receiving login credentials from a user via a user interface of an endpoint device to access an account;
    determining, in response to a prompt by the user on the user interface of the endpoint device, at least one resource transfer device on a wireless network of the endpoint device, wherein the resource transfer device comprises a payment card comprising a fingerprint authentication feature and a backscatter device, the backscatter device comprising a harvesting loop antenna for operatively coupling the resource transfer device to the wireless network, wherein the backscatter device is configured to harvest and backscatter multi-band energy at predetermined frequencies;
    displaying the resource transfer device on the user interface;
    receiving a selection of the resource transfer device via the user interface;
    activating the fingerprint authentication feature of the resource transfer device;
    receiving a signal of a fingerprint authentication from the resource transfer device, wherein upon a first condition where the fingerprint authentication indicates a mismatch between a stored fingerprint template stored on the resource transfer device and a fingerprint received on the fingerprint authentication feature of the resource transfer device, the endpoint device prompts a retry of the fingerprint authentication at the resource transfer device;
    receiving, on the endpoint device, confirmation from the user to pair the resource transfer device with the wireless network upon a second condition where the fingerprint authentication indicates a match between the stored fingerprint template stored on the resource transfer device and the fingerprint received on the fingerprint authentication feature of the resource transfer device;
    transmitting a one-time authentication token and a request for authorization to the endpoint device;
    receiving the one-time authentication token from the user; and
    storing pairing data comprising details of the wireless network and resource transfer device data in a storage device as a paired resource transfer device.

2. The system of claim 1, wherein executing the instructions further causes the processing device to perform the steps of:
    receiving a request for an electronic resource transfer from a merchant over the wireless network;
    receiving a selection from a user on a user interface of an endpoint device for the paired resource transfer device, wherein identification data from the paired resource transfer device is encrypted over the wireless network;
    transmitting a request to the user to authenticate the electronic resource transfer via the paired resource transfer device;
    receiving a signal of an authenticated fingerprint from the paired resource transfer device;
    authenticating the electronic resource transfer via data packets over the wireless network; and
    completing the electronic resource transfer.

3. The system of claim 1, wherein the resource transfer device is operatively coupled to the wireless network via a short-range wireless data transfer protocol.

4. The system of claim 1, wherein the resource transfer device is operatively coupled to the wireless network via Wi-Fi.

5. The system of claim 1, wherein the one-time authentication token is transmitted to the endpoint device via at least one selected from the group consisting of: a short message service and an authentication application.

6. A computer program product for electronic resource transfers in a distributed network via network-paired resource transfer devices, the computer program product comprising a non-transitory computer-readable medium comprising code causing an apparatus to:
    receive login credentials from a user via a user interface of an endpoint device to access an account;
    determine, in response to a prompt by the user on the user interface of the endpoint device, at least one resource transfer device on a wireless network of the endpoint device, wherein the resource transfer device comprises a payment card comprising a fingerprint authentication feature and a backscatter device, the backscatter device comprising a harvesting loop antenna for operatively coupling the resource transfer device to the wireless network, wherein the backscatter device is configured to harvest and backscatter multi-band energy at predetermined frequencies;
    display the resource transfer device on the user interface;
    receive a selection of the resource transfer device via the user interface;

activate the fingerprint authentication feature of the resource transfer device;

receive a signal of a fingerprint authentication from the resource transfer device, wherein upon a first condition where the fingerprint authentication indicates a mismatch between a stored fingerprint template stored on the resource transfer device and a fingerprint received on the fingerprint authentication feature of the resource transfer device, the endpoint device prompts a retry of the fingerprint authentication at the resource transfer device;

receive, on the endpoint device, confirmation from the user to pair the resource transfer device with the wireless network upon a second condition where the fingerprint authentication indicates a match between the stored fingerprint template stored on the resource transfer device and the fingerprint received on the fingerprint authentication feature of the resource transfer device;

transmit a one-time authentication token and a request for authorization to the endpoint device;

receive the one-time authentication token from the user; and store pairing data comprising details of the wireless network and resource transfer device data in a storage device as a paired resource transfer device.

7. The computer program product of claim 6, wherein the code further causes the apparatus to:

receive a request for an electronic resource transfer from a merchant over the wireless network;

receive a selection from a user on a user interface of an endpoint device for the paired resource transfer device, wherein identification data from the paired resource transfer device is encrypted over the wireless network;

transmit a request to the user to authenticate the electronic resource transfer via the paired resource transfer device;

receive a signal of an authenticated fingerprint from the paired resource transfer device;

authenticate the electronic resource transfer via data packets over the wireless network; and complete the electronic resource transfer.

8. The computer program product of claim 6, wherein the resource transfer device is operatively coupled to the wireless network via a short-range wireless data transfer protocol.

9. The computer program product of claim 6, wherein the resource transfer device is operatively coupled to the wireless network via Wi-Fi.

10. The computer program product of claim 6, wherein the one-time authentication token is transmitted to the endpoint device via at least one selected from the group consisting of: a short message service and an authentication application.

11. A method for electronic resource transfers in a distributed network via network-paired resource transfer devices, the method comprising:

receiving login credentials from a user via a user interface of an endpoint device to access an account;

determining, in response to a prompt by the user on the user interface of the endpoint device, at least one resource transfer device on a wireless network of the endpoint device, wherein the resource transfer device comprises a payment card comprising a fingerprint authentication feature and a backscatter device, the backscatter device comprising a harvesting loop antenna for operatively coupling the resource transfer device to the wireless network, wherein the backscatter device is configured to harvest and backscatter multi-band energy at predetermined frequencies;

displaying the resource transfer device on the user interface;

receiving a selection of the resource transfer device via the user interface;

activating the fingerprint authentication feature of the resource transfer device;

receiving a signal of fingerprint authentication from the resource transfer device, wherein upon a first condition where the fingerprint authentication indicates a mismatch between a stored fingerprint template stored on the resource transfer device and a fingerprint received on the fingerprint authentication feature of the resource transfer device, the endpoint device prompts a retry of the fingerprint authentication at the resource transfer device;

receiving, on the endpoint device, confirmation from the user to pair the resource transfer device with the wireless network upon a second condition where the fingerprint authentication indicates a match between the stored fingerprint template stored on the resource transfer device and the fingerprint received on the fingerprint authentication feature of the resource transfer device;

transmitting a one-time authentication token and a request for authorization to the endpoint device;

receiving the one-time authentication token from the user; and storing pairing data comprising details of the wireless network and resource transfer device data in a storage device as a paired resource transfer device.

12. The method of claim 11, wherein the method further comprises:

receiving a request for an electronic resource transfer from a merchant over the wireless network;

receiving a selection from a user on a user interface of an endpoint device for the paired resource transfer device, wherein identification data from the paired resource transfer device is encrypted over the wireless network;

transmitting a request to the user to authenticate the electronic resource transfer via the paired resource transfer device;

receiving a signal of an authenticated fingerprint from the paired resource transfer device;

authenticating the electronic resource transfer via data packets over the wireless network; and completing the electronic resource transfer.

13. The method of claim 11, wherein the resource transfer device is operatively coupled to the wireless network via a short-range wireless data transfer protocol.

14. The method of claim 11, wherein the resource transfer device is operatively coupled to the wireless network via Wi-Fi.

15. The method of claim 11, wherein the one-time authentication token is transmitted to the endpoint device via at least one selected from the group consisting of: a short message service and an authentication application.

* * * * *